United States Patent [19]

Palmisano

[11] Patent Number: 5,121,306
[45] Date of Patent: Jun. 9, 1992

[54] TOOL COMPARTMENT ASSEMBLY FOR MOUNTING ON A PICKUP TRUCK OR LIKE VEHICLE

[76] Inventor: Doug Palmisano, 4100 N. Powerline Rd., Ste. Q-9, Pompano Beach, Fla. 33073

[21] Appl. No.: 665,462

[22] Filed: Mar. 6, 1991

[51] Int. Cl.⁵ .............................................. B60Q 1/00
[52] U.S. Cl. ..................................... 362/80; 362/74; 362/154; 362/253; 296/37.6
[58] Field of Search ................... 362/61, 80, 74, 83.3, 362/154, 156, 253; 296/37.6, 180.1, 102, 99.1; 292/35, 36, 140, DIG. 25; 312/DIG. 33

[56] References Cited

U.S. PATENT DOCUMENTS

| | | | |
|---|---|---|---|
| 2,801,330 | 7/1957 | Gay | 362/156 |
| 4,081,191 | 3/1978 | Capozello | 292/DIG. 25 |
| 4,085,961 | 4/1978 | Brown | 312/DIG. 33 |
| 4,688,845 | 8/1987 | Kingsley | 296/102 |
| 4,855,881 | 8/1989 | Pence | 362/156 |
| 4,936,624 | 6/1990 | West | 296/37.6 |
| 4,973,099 | 11/1990 | Deaver et al. | 296/99.1 |

FOREIGN PATENT DOCUMENTS 2209714 5/1989 United Kingdom .............. 296/37.6

Primary Examiner—Stephen F. Husar
Attorney, Agent, or Firm—Malloy, Downey & Malloy

[57] ABSTRACT

A tool compartment adapted to be mounted to the bed of a truck between vertical side panels thereof, and including a lower base portion having an interior storage compartment and a cover hingedly attached thereto being movable between an open and a closed position relative to an open top of the base portion. A light mounting apparatus is attached to and extends upwardly from the cover, wherein auxiliary or other type lights may be mounted. A locking mechanism allows the cover to be locked in the closed position from within an interior of the truck.

12 Claims, 3 Drawing Sheets

TOOL COMPARTMENT ASSEMBLY FOR MOUNTING ON A PICKUP TRUCK OR LIKE VEHICLE

BACKGROUND OF THE INVENTION

The present invention relates generally to a tool compartment adapted to be mounted to the bed of a pickup truck or like vehicle and including a storage compartment with a cover hingedly attached thereto and a light mounting apparatus connected to and extending upwardly from the cover.

Often, pickup trucks and other like vehicles having an open flat bed are used in various industries such as construction and maintenance and repair services wherein it is necessary to carry a considerable amount of tools, equipment and supplies. The open flat bed of pickup trucks is ideal in these circumstances, providing a great deal of accessible storage area. However, a significant problem associated with carrying expensive tools and equipment on a pickup truck is the absence of a means to protect the tools and equipment from theft. Recently, there have been a number of security tool boxes developed which are adapted to be mounted to the bed of a pickup truck so that tools and other expensive equipment can be locked therein. While these toolboxes are generally suitable for their intended purpose, they are somewhat unsightly and are generally only used on commercial vehicles, wherein appearance is of no particular importance. On the other hand, many recent model pickup trucks have been designed to have a sleek, attractive appearance and include added structures such as roll bars, air foils, and the like providing a more attractive appearance to the vehicle. Often, auxiliary lights are mounted to a top of the roll bar or air foil. On these more attractive, new model pickup trucks, it is generally not desirous to add any structure which will detract from the overall appearance of the vehicle.

Accordingly, there is presently a need for a tool compartment which is adapted to be mounted to the bed of a pickup truck or like vehicle which will enhance the overall appearance of the vehicle.

Therefore, it is an object of the present invention to provide a tool compartment assembly which is adapted to be mounted to the bed of a pickup truck or like vehicle having a lower tool compartment and a light mounting structure such as a roll bar or air foil attached to a cover of the tool compartment so as to enhance the overall appearance of the vehicle.

It is a further object of the present invention to provide a tool compartment assembly which includes a locking mechanism adapted to lock a cover in a closed position.

It is yet a further object of the present invention to provide a locking mechanism which is only accessible from a cabin interior of the vehicle thereby increasing the security of contents stored within a compartment thereof.

These and other objects and advantages of the present invention will be more readily apparent in the description which follows.

SUMMARY OF THE INVENTION

The present invention is directed to a tool compartment assembly adapted to be mounted transversely across the bed of a pickup truck or like vehicle between vertical side panels thereof. The tool compartment assembly includes a lower base portion defining a storage compartment with a cover hingedly attached thereto so as to move between an open and closed position relative to an open top of the tool compartment. A light mounting structure is attached to a top of the cover and includes a light mounting platform ordinarily disposed in adjacent, coplanar relation to a roof of the truck when the cover is in the closed position. A locking mechanism, operable from an interior of the truck, allows the cover to be locked in the closed position thereby preventing theft of the contents stored within the compartment.

The invention accordingly comprises the features of construction, a combination of elements, and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF PREFERRED EMBODIMENT

Figure 1:
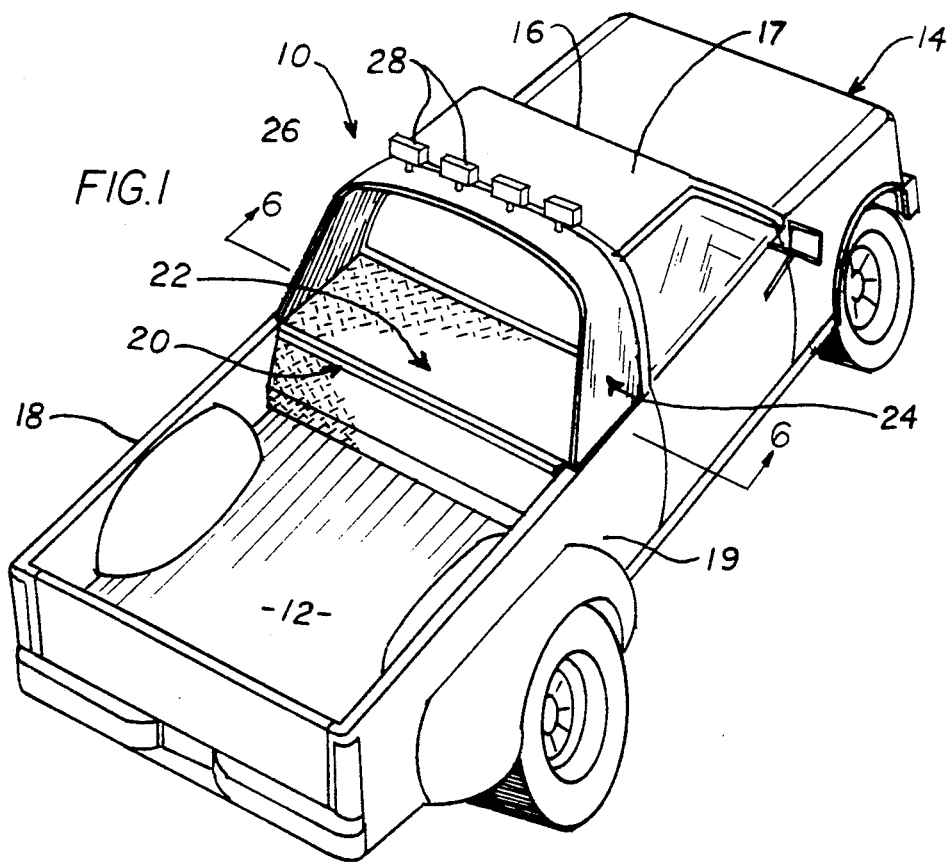
FIG. 1 is a perspective view of a pickup truck and the tool compartment assembly of the present invention mounted to a bed thereof.

Referring to FIG. 1, the present invention is directed to a tool compartment assembly, generally indicated as 10, adapted to be mounted to the bed 12 of a pickup truck 14 or like vehicle, behind a cabin 16 thereof, so as to extend transversely between opposite side panels 18, 19 of the truck.

The tool compartment assembly 10 of the present invention includes a base portion 20 and a cover 22 hingedly attached to the base so as to be movable between an open and closed position. A light mounting apparatus 24 is attached to a top of the cover 22 and is generally dimensioned and configured so as to substantially conform within an exterior configuration of the cabin 16. A horizontally extending upper portion of the light mounting apparatus 24 includes a light platform portion 26 normally positioned in adjacent, coplanar relation to a roof 17 of the cabin 16 when the cover 22 is in the closed position. The light platform portion is ideally suited for mounting lights 28 thereto.

Figure 2:
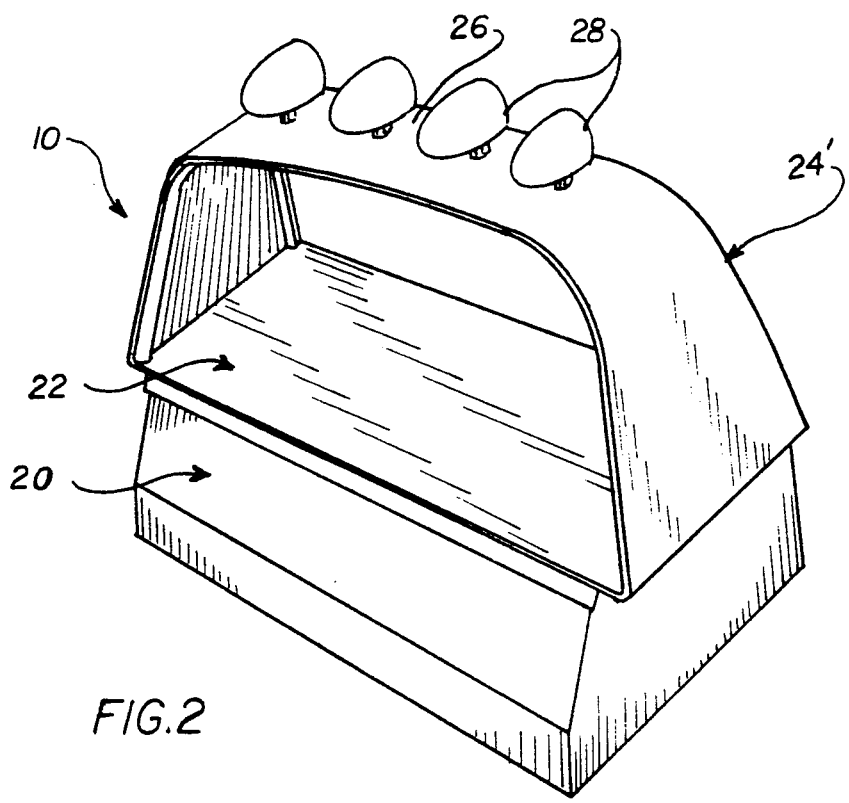
FIG. 2 is a perspective view of one preferred embodiment of the present invention.

In one embodiment of the present invention, as seen in FIG. 2, the light mounting apparatus comprises a one-piece, integrally formed structure 24 generally resembling an air foil. The overall shape and configuration of the one-piece air foil structure is designed to conform with the exterior transverse configuration of the cabin 16.

Figure 3:
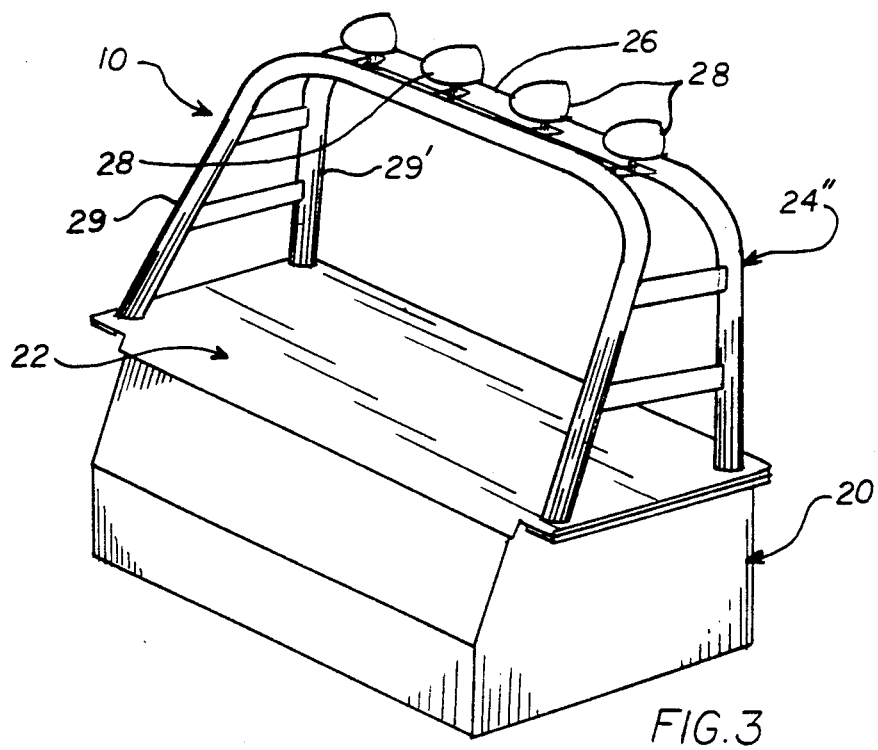
FIG. 3 is an alternative preferred embodiment of the tool compartment assembly of the present invention.

In another embodiment of the present invention, shown in FIG. 3, the light mounting apparatus includes a roll-bar structure 24" including a pair of bars 29, 29' each attached at opposite ends to the top of the cover 22 and extending in substantially parallel relation to one another so as to define an overall configuration generally resembling the exterior transverse configuration of the cabin 16.

Figure 4:
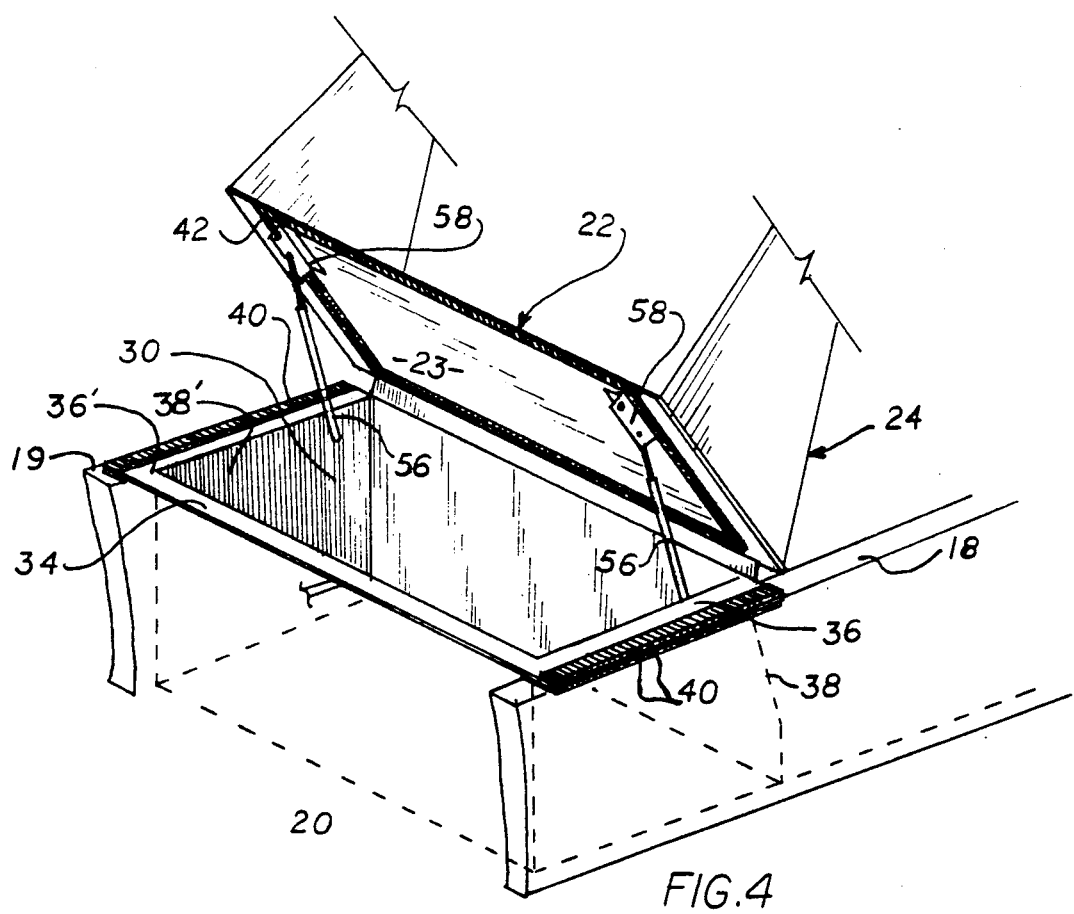
FIG. 4 is an isolated view shown in perspective illustrating a cover of the tool compartment assembly in an open position.

Referring to FIG. 4, the cover 22 is shown in the open position relative to an open top of the base portion 20 thereby facilitating access to an interior storage compartment 30. The base portion 20 includes a flanged lip 34 extending about the open top including a pair of side flanges 36 and 36' extending outwardly from a top edge of corresponding side walls 38, 38' of the base portion 20. The side flanges 36 and 36' are each adapted to engage a top edge of the opposite side panels 18, 19 of the truck, substantially supporting the assembly 10 in a fixed, secure position, so as to prevent movement relative to the bed 12. The assembly 10 may be mounted to the truck 14 by fastening the side flanges 36, 36' to the top edge of the side panels 18, 19 using conventionally known connectors such as bolts.

The upper and lower surfaces of the side flanges 36, 36' have resilient seals 40 such as rubber, attached thereto. The seals 40 on the lower surfaces of the side flanges 36, 36' provide for a firm, even mount while also protecting the truck's finish from being scratched. The seals 40 on the upper surfaces of the side flanges 36, 36' provide a cushioned, water-tight seal between the base portion 20 and the cover 22. An upper resilient seal 42 is attached to an undersurface 23 of the cover 22 extending substantially about a periphery thereof in spaced relation to a peripheral edge of the cover 22. The upper seal 42 is adapted to engage the flanged lip 34 of the base when the cover is in the closed position, thereby sealing the interior compartment 30, preventing, water, dirt, dust, etc. from damaging the contents therein.

In the preferred embodiment, a pair of shock absorbing extension rams 56 are connected at opposite ends to an interior of the side walls 38, 38' and the undersurface 23 of the cover 22. L-shaped brackets 58 can be used to attach one end of the rams 56 to the undersurface 23 of the cover 22. The rams 56 are adapted to regulate the rate of movement of the cover 22 when opening and closing, thereby preventing damage to the supporting structure of the assembly.

Figure 5:
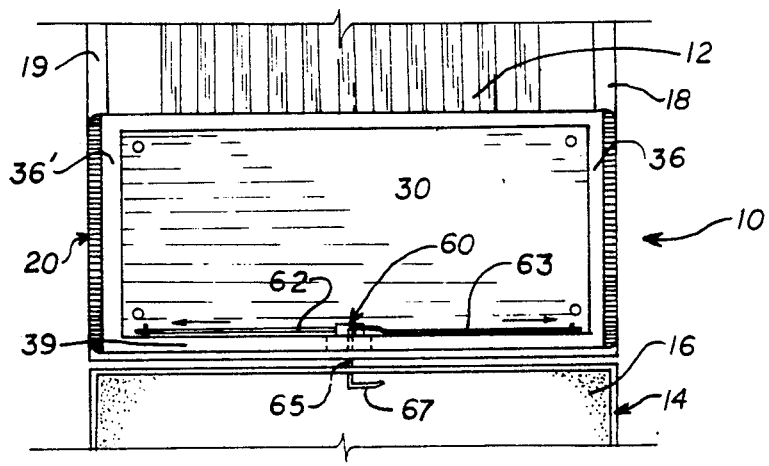
FIG. 5 is a top plan view of a base portion of the tool compartment assembly of the present invention mounted to the bed of a pickup truck.

A top plan view of the open top of the base portion 20 in FIG. 5 illustrates the mounted position of the assembly 10 relative to the truck bed 12, with the side flanges 36, 36' supported on the side panels 18, 19 of the truck. A locking mechanism 60 is also illustrated in FIG. 5 and includes a pair of transverse extension rods 62, 63 movably connected to an interior surface of a front wall 39 of the base portion 20 so as to be laterally movable, in the direction of the arrows, between a locked position and an unlocked position. A shaft 65 extending from the attachment of the rods 62, 63 and into a rear of the cabin 16 permits manipulation of the rods 62, 63 from within the cabin by rotating a handle 67 attached thereto. In this manner, the cover 22 can only be unlocked from within the cabin, thereby increasing the security of the contents locked within the compartment interior 30 and reducing the likelihood of theft.

Figure 6:
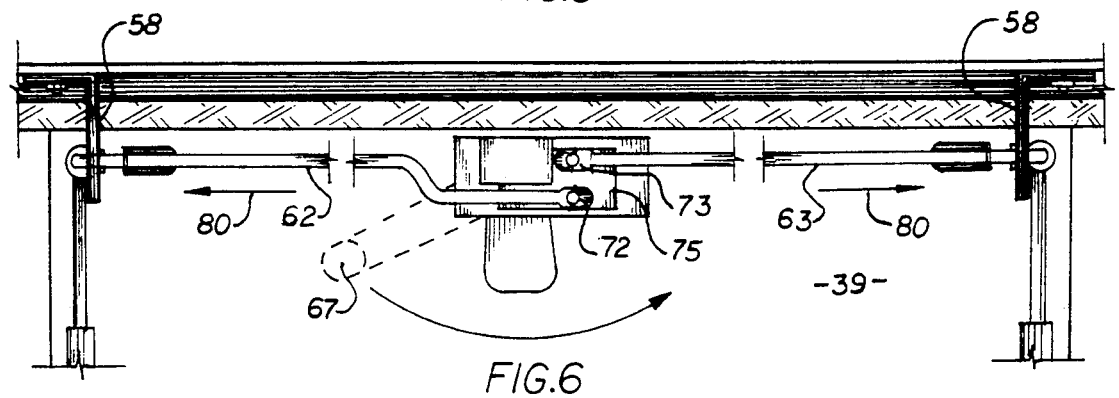
FIG. 6 is an isolated plan view of a locking mechanism of the present invention.

The locking mechanism 60 is more accurately illustrated in FIG. 6, wherein proximal ends 72, 73 of the extension rods 62, 63 are attached to a cam structure 75 rotatably mounted to an end of the shaft 65 (not shown in FIG. 6), wherein movement of the handle 67 (as indicated by the arrow), cause lateral movement of the rods 62, 63 as indicated by the arrows 80. A pair of guide brackets 82, 82' attached to the interior surface of the front wall 38 maintain the rods 62, 63 in a supported position. In the locked position, the rods 62, 63 each pass through an aperture formed in the L-shaped brackets 58, thereby locking the cover 22 in the closed position.

Figures 7, 8:
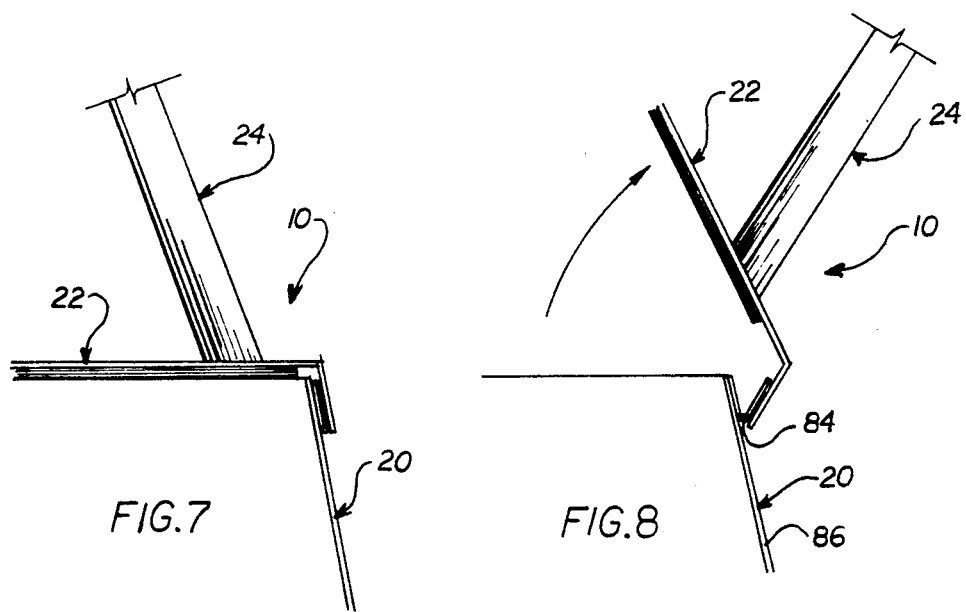
FIG. 7 is an isolated side plan view of the cover in a closed position in covering relation to an open top of the base portion.
FIG. 8 is an isolated side plan view of the cover in an open position illustrating a hinged attachment of the cover to the base portion.

Referring to FIGS. 7 and 8, movement of the cover between the closed and the open position is illustrated. A piano-type hinge 84 is attached along a rear edge of the cover 22 to a top edge of a back wall 86 of the base portion 20, thereby facilitating movement of the cover 22 between the open and closed positions.

Now that the invention has been described, what is claimed is:

1. A tool compartment assembly adapted to be mounted to a bed of a pickup truck or like vehicle for the storage of tools and other articles therein, said assembly comprising:

a base having a bottom and a surrounding wall structure including a front wall, a rear wall, and two opposite side walls, and an open top disposed in surrounding relation to a compartment interior, said base structured to be mounted transversely across a width of the bed adjacent a cabin of the pickup truck between oppositely disposed vertical side panels thereof, a cover hingedly connected to said base and structured to be moved between an open position and a closed position, said closed position defined by said cover disposed in substantially overlying, covering relation to said open top, a super structure connected to and extending upwardly from side ends of a top surface of said cover and further extending substantially horizontally across the length of said cover in spaced relation above said top surface thereof, light mounting means on said super structure for mounting lights thereto, said light mounting means including a light platform portion normally disposed in substantially adjacent, coplanar relation to a roof of the cabin of the truck when said cover is in said closed position, and attachment means for attaching said base to the pickup truck.

2. An assembly as in claim 1 further comprising locking means structured and disposed for locking said cover in said closed position.

3. An assembly as in claim 2 wherein said locking means is operable between a locked position and an unlocked position by manipulating a lock operation means located within a cabin interior of the truck.

4. An assembly as in claim 3 wherein said base includes a flanged upper peripheral edge disposed about said open top and including two side flange portions extending outwardly from a top edge of said opposite side walls, said side flange portions structured and disposed to supportably engage a top edge of said vertical side panels.

5. An assembly as in claim 4 wherein said side flange portions include a resilient seal attached to and extending substantially along a length thereof on upper and lower surfaces thereof.

6. An assembly as in claim 5 wherein said cover includes an upper resilient seal attached to an undersurface thereof and adapted to engage said flanged upper peripheral edge in sealed relation therewith when said cover is in said closed position.

7. An assembly as in claim 6 further including at least one shock absorbing telescopic extension ram attached at opposite ends to said base and said cover respectively and structured to regulate a rate of movement of said cover between said open and closed positions.

8. An assembly as in claim 7 wherein said locking means includes a pair of transverse extension rods each movably mounted to an interior surface of said front wall and adapted to move laterally between said locked and said unlocked positions.

9. An assembly as in claim 8 wherein said lock operation means includes a cam member mounted to said interior surface of said front wall with said transverse extension rods connected to said cam member, wherein rotation of said cam member causes lateral movement of said transverse extension rods.

10. An assembly as in claim 9 wherein said lock operation means further includes a shaft extending between the cabin interior of the truck and said compartment interior of said base, said shaft connected at one end to said cam member, and an opposite end of said shaft disposed within said cabin interior and including a handle attached thereto, wherein movement of said handle causes rotation of said cam member.

11. An assembly as in claim 6 wherein said super structure comprises a one-piece, integrally formed structure defining an air foil dimensioned and configured so as to substantially conform with an exterior configuration of the cabin of the truck.

12. An assembly as in claim 6 wherein said super structure comprises a pair of bars each attached at opposite ends to opposite sides of said cover and extending upwardly therefrom, said bars further extending in substantially parallel relation to one another above said cover and substantially along a length thereof in spaced relation above said top surface of said cover.

* * * * *